United States Patent [19]
Estenson et al.

[11] Patent Number: 5,739,534
[45] Date of Patent: Apr. 14, 1998

[54] METHODS AND APPARATUS FOR DETECTING FLUIDS

[75] Inventors: Michael A. Estenson, Ely; J. Scott Petty; Joseph R. Adamski, both of Cedar Rapids, all of Iowa

[73] Assignee: Raytheon Corporation, Lexington, Mass.

[21] Appl. No.: 752,185

[22] Filed: Nov. 18, 1996

[51] Int. Cl.⁶ .................................................. G01J 5/02
[52] U.S. Cl. .................. 250/339.11; 250/357.1; 250/341.8; 250/339.1; 68/12.05
[58] Field of Search ................. 250/339.1, 339.11, 250/341.8, 357.1; 68/12.05, 12.21; 8/158

[56] References Cited

U.S. PATENT DOCUMENTS 4,653,294  3/1987  Akinaga .............................. 68/12.21
4,946,242  8/1990  Tanno et al. ....................... 250/227.11
5,218,206  6/1993  Schmitt et al. ...................... 250/339.1
5,220,168  6/1993  Adamski et al. .................. 250/339.11
5,305,485  4/1994  Getz et al. ................................ 8/158

FOREIGN PATENT DOCUMENTS

3812089  10/1989  Germany ............................... 68/12.05

*Primary Examiner*—Don Wong
*Attorney, Agent, or Firm*—Arnold, White & Durkee

[57] ABSTRACT

A system for detecting the presence of a fluid comprising: means for transmitting at least two infrared electromagnetic signals toward a fluid, each of the infrared electromagnetic signals have different wavelengths. It also includes means for sensing the reflection of each of the electromagnetic signals as well as means for creating a plurality of electrical signals indicating the intensity of the reflected signals. Finally, it includes means for determining the presence of said fluid by comparing the intensities of the plurality of electrical signals.

8 Claims, 8 Drawing Sheets

METHODS AND APPARATUS FOR DETECTING FLUIDS

FIELD OF INVENTION

The invention relates to devices and methods for detecting the presence of a fluid. Specifically, the invention relates to devices and methods for detecting the presence of a fluid on a surface or detecting the level of a fluid in a container and then, if needed, adjusting the fluid level to conform to a predetermined standard.

BACKGROUND OF THE INVENTION

It is often desirable to detect whether a fluid is present on a surface or to detect the level of fluid in a container and then, if needed, to adjust the fluid level in the container to conform to a predetermined standard. For example, it is desirable to be able to determine when the water filling the tub of a washing machine reaches a level that covers the clothes in the tub assuring that there is an adequate volume of water present during the subsequent wash cycle to properly clean the clothes while preventing filling of the tub with an excessive amount of water which is wasteful.

In known washing machines, a user selects the volume of water inputted into the tub by estimating the quantity of clothes to be washed and manually setting a switch, for example, to a low, medium, or high setting. Thus, the water level in these washing machines is preset and corresponds to the user's estimate of quantity or volume of clothes to be washed which results in several undesirable performance characteristics.

In known washing machine systems, if the user underestimates the quantity or volume of clothes to be washed and, after filling, the water level is too low for the actual load of clothes in the tub of the washing machine, then that volume of clothes is only partially covered by water. The subsequent washing cycle is, therefore, ineffective in properly cleaning the clothes. On the other hand, if the user overestimates the quantity or load of clothes to be washed and, after filling, the water level is too high for the load of clothes in the tub of the washing machine then water is being wasted. The later situation is particularly undesirable in today's ecologically sensitive community where the waste of a resource such as water is to be avoided. The waste of water is also economically lo disadvantageous as the cost of supplying water to many households and businesses is rising. Therefore, it is desirable to be able to vary the actual volume of water in a tub of a washing machine to correspond to the actual volume of clothes to be washed thereby avoiding the wasting of water or the ineffective cleaning of clothes.

The present invention is also useful in the situation where it is desirable to detect the presence of a fluid on a surface. For example, motorists frequently drive under conditions when vision is diminished or impaired such as at night or in fog. The motorist often can not determine when they have passed from favorable, safe road conditions to unfavorable, dangerous road conditions resulting from rain, sleet, snow, or ice being present on the surface of roads. It is desirable to have a fluid detection system that warns the motorist when he or she is operating on a road surface that has water, snow, or ice and accordingly may be unsafe or at least dictate defensive driving procedures. In such a situation, it is also desirable for the fluid detection system to verify that the automobile has passed onto a road surface that is genuinely hazardous before warning the driver thereby avoiding a false warning when the automobile passes over a small amount of fluid, such as a puddle.

SUMMARY OF THE INVENTION

The present invention is a fluid detection system which is used to detect the presence of any fluid on a surface or to detect the level of fluid in a container and then to advise the user of the system of the presence of the fluid and, if needed, to control the operation of other devices which adjust the level of fluid in the container. Without limiting the various uses of the fluid detection system of the present invention, it will be described herein as used with a washing machine to detect when the level of water in the tub of the washing machine covers a specific load of articles (e.g., clothes) to be cleaned.

The present invention comprises timing circuitry which creates a series of pulses that activate a transmitter. The transmitter emits at least two infrared electromagnetic signals toward the water being inputted in the tub of a washing machine. These infrared electromagnetic signals are transmitted due to the timing pulses during different time periods and have different wavelengths. Accordingly, the infrared electromagnetic signals are absorbed differently by water compared to other materials such as clothes in the tub of the washing machine. The first electromagnetic signal has a first wavelength and is transmitted during a first time period and the second electromagnetic signal has a second wavelength and is transmitted during a second time period. The transmitter used can be any type of device capable of emitting at least two electromagnetic signals having different wavelengths, for example, a pair of LEDs. The electromagnetic signals are reflected and these reflected signals are detected by a receiver. The receiver used by the invention can be any kind of sensing arrangement, for example, photosensitive diodes or transistors. Since the transmitted signals are of different wavelengths and the absorption characteristics of the water and clothes are different, these signals are absorbed by the water or the clothes at different rates and the intensities of the reflected electromagnetic signal change over time, but at different rates. The received reflected electromagnetic signals are convened into electrical signals by conversion circuitry as is known by those skilled in the art. The electrical signals produced by the conversion circuitry referred to above are of different amplitudes.

Sample and hold circuitry samples the magnitudes of these electrical signals and holds these values for later use by the system. Another circuit averages the samples to obtain a consistent reading. A comparator circuit receives the output from the averaging circuitry and compares the magnitudes of the electrical signals and detects when the magnitude of one electrical signal becomes greater than the magnitude of the other electrical signal. If the magnitudes of the separate electrical signals were graphed against time, their curves will intersect at a "crossing-point." The crossing-point indicates that the transmitted electromagnetic signals are being reflected by the water as opposed to the clothes, e.g., the water level has become higher than the clothes level. Thus, by comparing the magnitudes of the electrical signals, a crossing-point is detected which indicates the level of the water exceeds the level of the clothes in the tub of the washing machine.

The comparator circuit provides an output signal when the magnitude of one of the electrical signals becomes greater than the magnitude of the other electrical signal, e.g., the crossing point is detected and passed. The output of the comparator circuitry is received by standard washing machine control circuits (e.g., a solenoid which controls a valve in the water line), as is well known to one of ordinary skill, for stopping of the filling of the tub.

In an alternate embodiment of the fluid detection system for use in washing machines, the output of the comparator circuitry is also received by a timing circuit. The output of the timing circuit is received by the standard washing machine circuit, as is well known to one of ordinary skill, which controls the rotation of the tub. In this embodiment, the tub, under control of the timing circuit, is rotated for a brief period of time. The rotation of the tub evens out the distribution of clothes in the tub to assure that the detection of a fluid level was not due to an uneven distribution of clothes in the tub which would result in a false detection of the water level exceeding the clothes level. After rotation of the tub, the comparator determines if one of the electrical signals is still greater than the other signal thereby confirming that the water level exceeds the clothes level. If the comparator determines that the one electrical signal is now less than the other electrical signal, indicating the redistributed clothes level is greater than the water level, then the output of the comparator signals the standard washing machine control circuit to allow the flow of water into the tub. The above process is repeated until another crossing point is detected and after the rotation of the tub the flow of water into the tub remains off. At this point, the process is complete and the "true" optimum water level has been detected.

In another alternate embodiment, the present invention also comprises circuitry which adjusts the water level in the tub on subsequent washing machine cycles. For instance, on subsequent rinse cycles, the tub of the machine is filled to 75 percent of the initial filling level. Circuitry is used to store the initial filling-level value and to compute 75 percent of that value. This information is then used to activate the water solenoids and fill the tub of the washer in a manner well known to those of ordinary skill in the field.

The present invention additionally may use fans, blowers, or water jets for dealing with conditions in the environment where the invention is used. For example, since the sensing arrangement may become occluded with water vapor or coated with dirt or other debris during operation, the invention uses blowers or water jets to clean the LED transmitters and photosensitive diode receivers.

While the invention is susceptible to various modifications and alternative forms, a specific embodiment thereof has been shown by way of example in the drawings and will herein be described in detail. It should be understood, however, that it is not intended to limit the invention to the particular forms disclosed. On the contrary, the intention is to cover all modifications, equivalents, and alternatives falling within the scope of the invention as defined by the appended claims.

DESCRIPTION OF THE PREFERRED EMBODIMENT

Figure 1A:
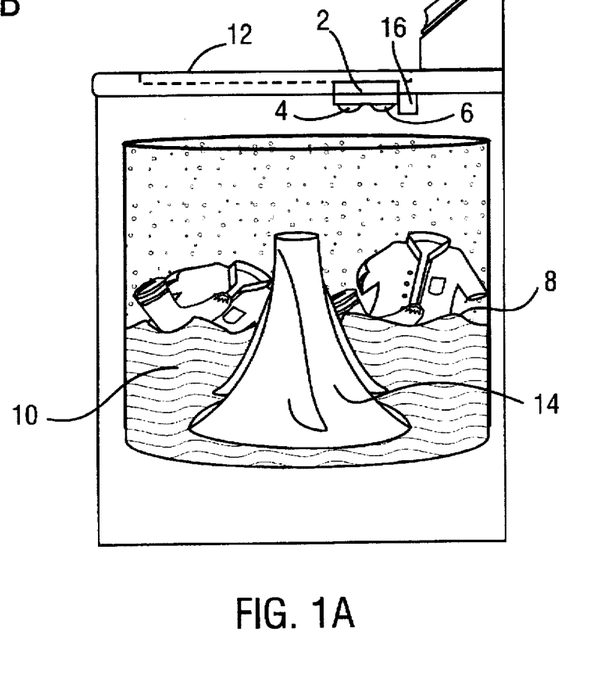
FIG. 1a shows a fluid level detector in a washing machine according to principles of the present invention.
Figure 1B:
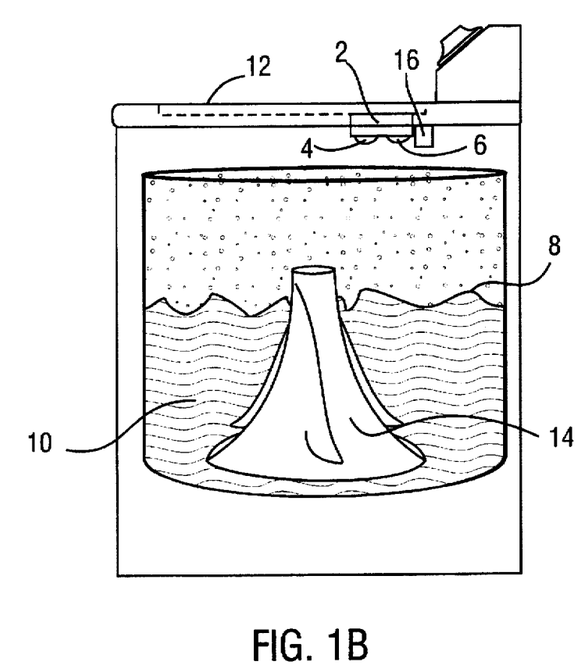
FIG. 1b shows a fluid level detector in a washing machine according to principles of the present invention.

A fluid detector system 2 of the present invention as it is used in washing machines is illustrated in FIG. 1a which allows for the detection of water in the tub of the washing machine and for the subsequent use of this information to adjust, if needed, the level of water in the tub of the washing machine. The detection system 2 comprises a transmitter 4 and a sensor 6. The transmitter 4 generates at least two different infrared electromagnetic signals during different time periods toward the surface 8 of water and clothes aggregate 10. Alternatively, the transmitters could emit signals at the same time and use two sensors with optical band pass filters for detection of reflected electromagnetic signals. The detector 2 is shown attached to lid 12 of the washing machine. The detector 2 can be positioned at any location inside the washing machine as long as it is sufficiently separated from the water and the clothes so that it can transmit and receive reflected electromagnetic signals without interference from the agitator and walls of the tub. In an alternate embodiment, the detector 2 is attached to the side of agitator 14. When the detector 2 is mounted to the agitator 14, the transmitter 4 is battery powered since it is difficult to run electrical wires through the agitator 14. In that case, information from the detector 2 on the agitator is provided by either a radio or optical link. FIG 1a shows the system as the tub of the washer is filling, i.e., the water has not yet covered the clothes. FIG. 1b illustrates the washing machine tub as the water has just covered the clothes. In the preferred embodiment, one detector is used to detect when the water level covers the clothes. Accordingly, this system relies upon electromagnetic signals reflected from one location of the tub of the washing machine. This arrangement may result in a false reading or measurement if the clothes are bunched or piled high in that location. In an alternate embodiment, multiple detectors are mounted inside the washing machine and for a two detector system the electromagnetic transmission of one detector is directed towards the front of the tub and the electromagnetic transmissions of the second detector is directed towards the back of the tub. In this arrangement, both detectors must detect the presence of water before the valve filling the tub is closed. In the multi-sensor embodiment, the transmitters can be pulsed separately.

In order to prevent the transmitter 4 or the sensor 6 from malfunctions due to environmental conditions inside the tub of the washing machine, a cleaning means 16 is included as part of detector 2. For example, the operation of the transmitter 4 of the sensor 6 may be affected by the presence of steam or condensation. In the preferred embodiment, cleaning means 16 comprises a small fan directed toward the transmitter 4 and sensor 6 to keep the surfaces of these devices dry and the area around them free of steam. In an alternate embodiment, the cleaning means 16 also comprises a water jet which rinses excess dirt or soap from the surfaces of transmitter 4 and sensor 6.

Figure 2:
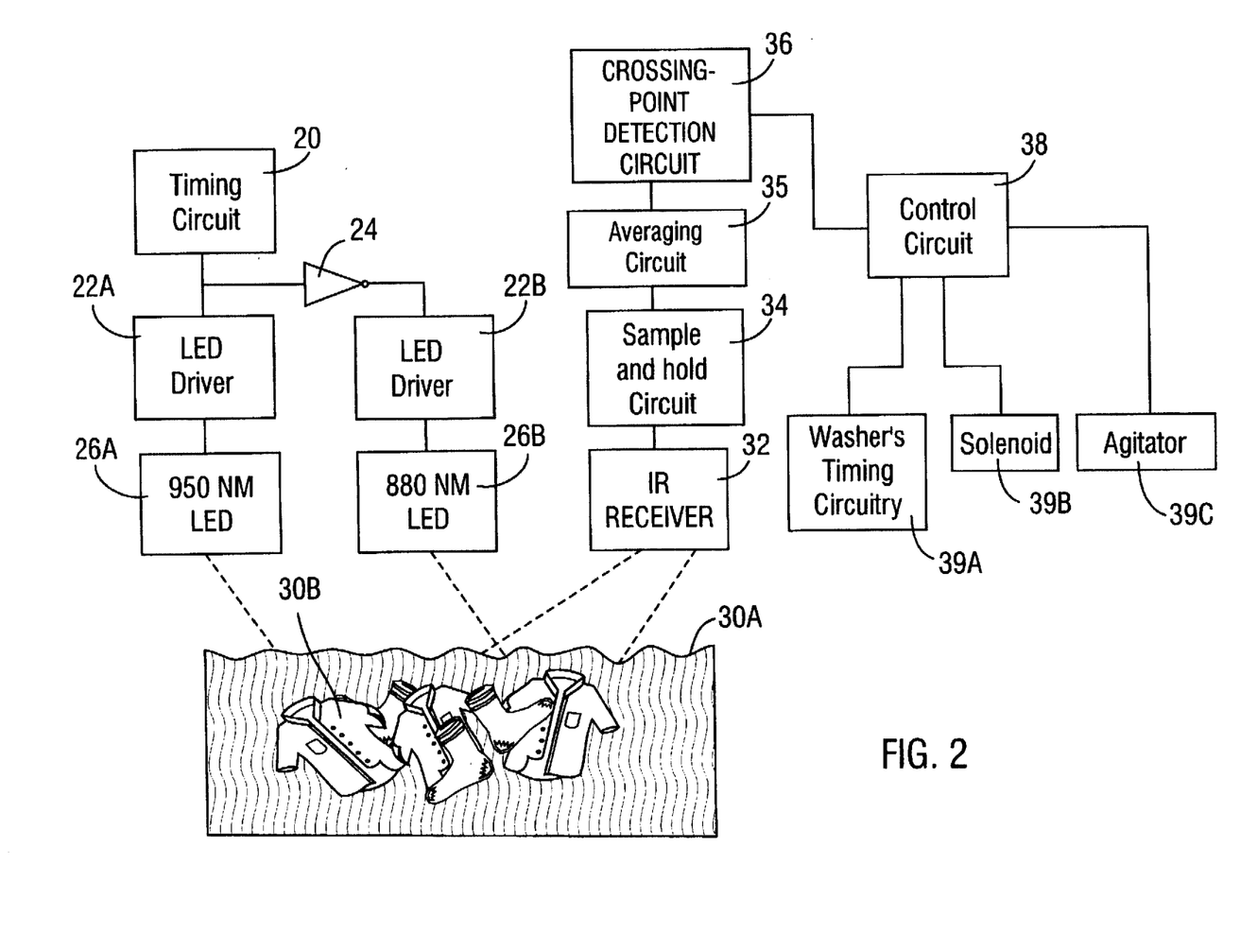
FIG. 2 shows a block diagram of the fluid level detection system according to principles of the current invention.

The block diagram of FIG. 2 illustrates fluid detection system 2 of the present invention for use in a washing machine. Detector 2 determines when the level of water flowing into the tub of a washing machine just exceeds the level of clothes in the tub to be washed and then shuts off the flow of water into the tub. When the amount of water used in the tub of the washing machine just covers the clothes, it is sufficient for the proper cleaning of the clothes. If the level of the water in the tub rises well above the level of clothes, then water is being wasted. A timing circuit 20 produces a series of pulses which drive LED driver 22a and through inverter 24, driver 22b. Driver 22a drives a 950 nanometer diode 26a when the timing pulse is high while driver 22b drives 880 nanometer diode 26b when the timing pulse is low.

The detection system 2 samples only one reflected signal at a time and avoids the interference problems associated with concurrently sampling and processing multiple signals. The series of pulses originating from timing circuit 20 is inverted by inverter 24, so that when the input to driver 22a is high, the input to driver 22b is low. Alternatively, when the input to driver 21a is low, the input to driver 21b is high Since the LEDs fire upon a high pulse, this arrangement guarantees that only one LED fires at a given time.

Electromagnetic signals incident from either diode 26a or diode 26b are reflected from clothes 30a and water 30b. An infrared (IR) sensor 32 receives the reflected signals from the clothes 30a or water 30b. The sensor 32 produces two electrical signals indicating the intensities of the reflected signals.

Sample and hold circuit 34 separately samples the two electrical signals produced by the sensors 32 and holds their magnitudes for later processing by comparison circuit 36. An averaging circuit 35 is connected between the sample and hold circuit 34 and the comparison circuit 36 for averaging the signal, that is, reducing the noise to an acceptable level. The comparison circuit 36 provides an output signal when the magnitude of one of the electrical signals becomes greater than the magnitude of the other electrical signal, e.g., the crossing point is detected and passed. The output signal of the comparison circuit 36 is received by standard washing machine control circuits 38 (e.g., a solenoid which control a valve in the water line), as is well known to one of ordinary skill, for stopping of the filling of the tub.

Figure 3:
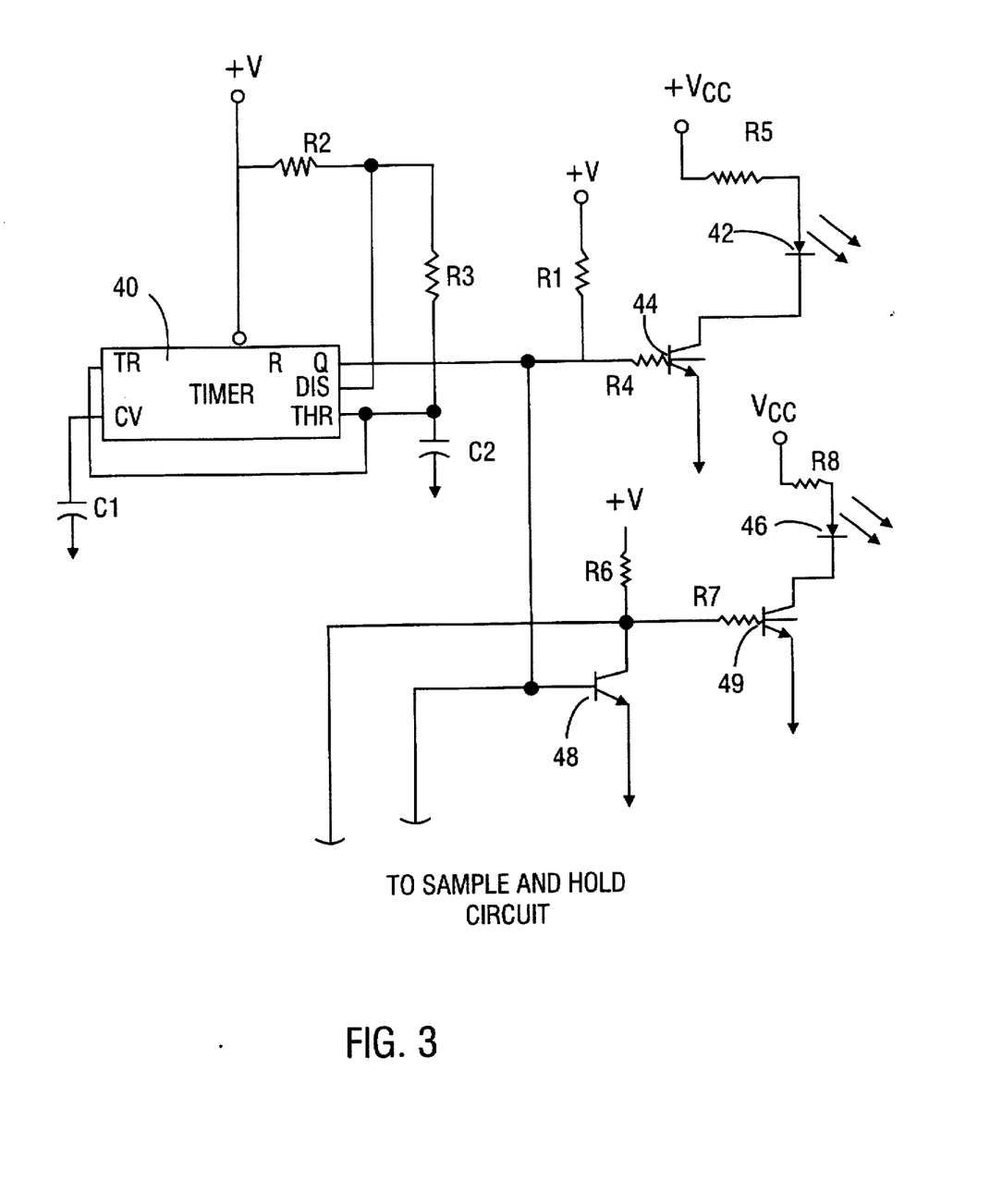
FIG. 3 shows a timing and driver circuit according to principles of the present invention.
Figure 4:
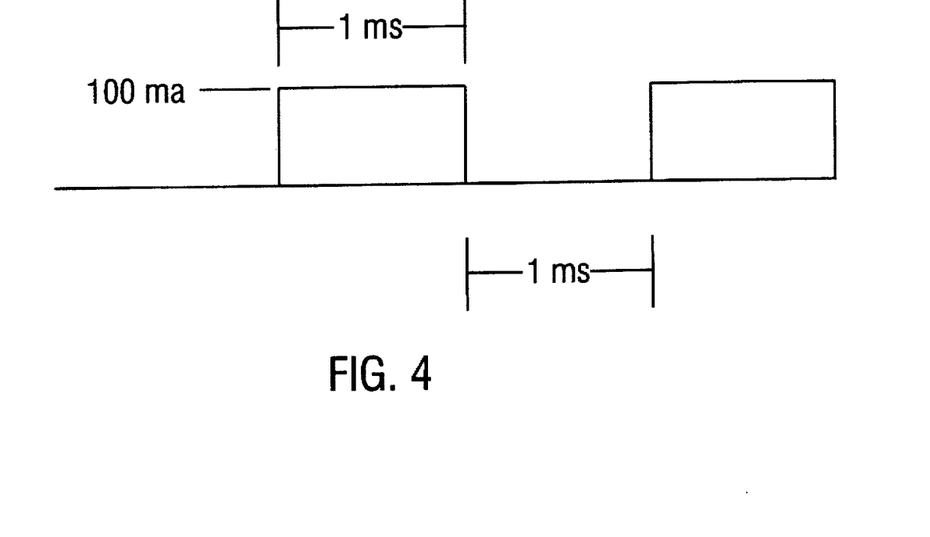
FIG. 4 shows a timing diagram of the pulses generated by the timing circuit according to principles of the current invention.

The timing and pulse driving circuits 20, 22a, and 22b are shown in FIG. 3 where timer 40 produces a pulse train as illustrated in FIG. 4. The circuit of timer 40 uses commercially available timer chips such as the LM 555 or any other circuit to produce the pulse train. The timing circuit generates a fifty percent duty cycle square wave output. The frequency of the output is determined by resistors R2, R3 and capacitor C2; however, the frequency is not critical to the successful operation of the timing circuit. With R2 at 1.3 K ohms, R3 at 360 ohms, and C2 at 1 micro farad, the output frequency is a square wave with a frequency of 2 Hz. As illustrated in FIG. 4, the strength of the signal is 100 mA. Specifically, when the output of timer 40 is high, transistor 44 is on and LED 42, which is the 880 nanometer LED, emits electromagnetic signals. When the output to timer 40 is high, transistor 48 is on, which turns off transistor 49, which, in turn, turns off 950 nanometer LED 46.

Figure 5:
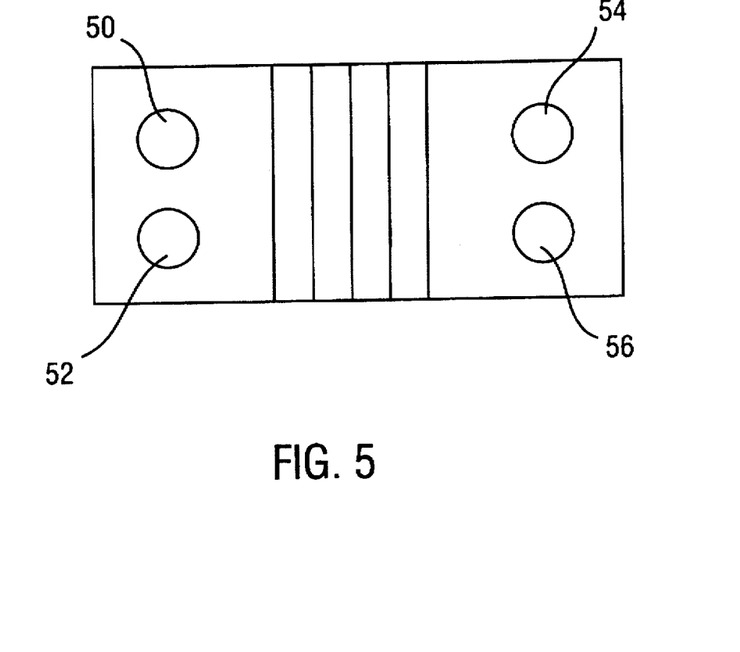
FIG. 5 shows a diagram of the detector arrangement according to principles of the present invention.

As shown in FIG. 5, a housing contains LEDs 50 and 52 and photosensor diodes 54 and 56. The LEDs 50 and 52 are 23-milliwatt LEDs that emit a discrete or narrow band of infrared energy having a particular center or characteristic wavelength. LED 50 has a center wavelength of 880 nanometers while LED 52 has a center wavelength of 950 nanometers. Infrared detectors or photosensors 54 and 56, such as photosensitive diodes, are mounted as shown adjacent to LEDs 50 and 52. One example of a photosensitive diode is a VTS 7080 photodiode by E.G. & G Vactec of St. Louis, Mo.

As mentioned above, the infrared LEDs 50 and 52 emit electromagnetic signals with different wavelengths and are pulsed separately at different times for about 50 nanosecond intervals. The period of the pulsing cycles can vary, but is typically around 100 nanoseconds. Infrared photosensor diodes 54 and 56 receive the reflected light from the clothes and water mixture after each pulse. The output of the diodes 54 and 56, based on the intensity of the reflection, is an analog voltage. The analog voltages are similar in amplitude and have the same relative magnitudes, with respect to each other, for any clothing material.

Figure 6:
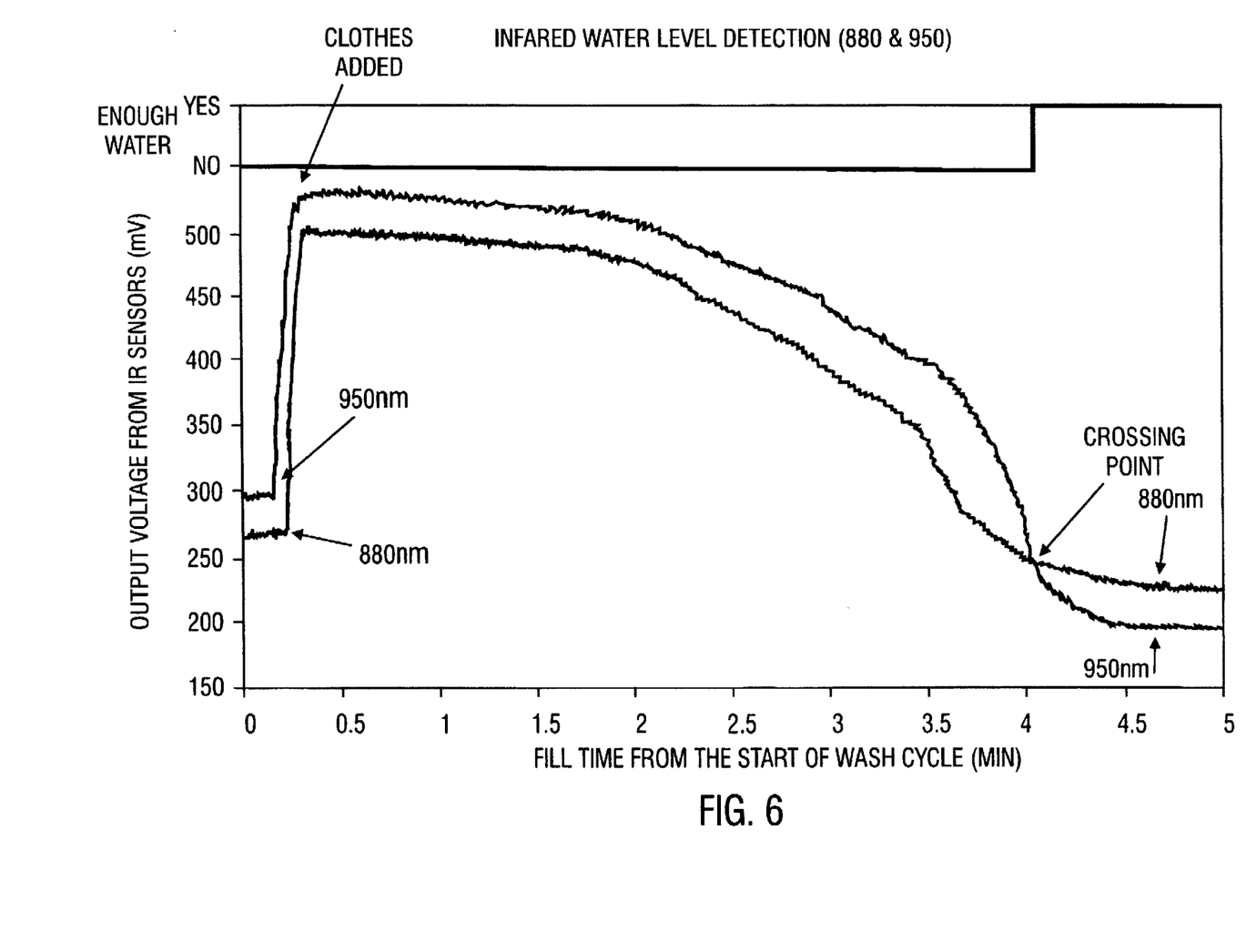
FIG. 6 shows a graph of the detected analog voltages for both 880 nanometer and 950 nanometer LEDs according to principles of the current invention.

The change of voltage magnitudes over time is used by the system to detect the optimum water level for the clothes and water mixture in the tub and using this information to adjust the water level in the tub. When dry clothes are added to the washer tub more of the reflected 950 nanometer light is detected than the reflected 880 nanometer light due to the absorption characteristics of the infrared light. This remains true until the filling water begins to rise over the clothes of the washer tub. A graph of the amplitude of the electrical signals versus time is shown in FIG. 6. As shown, when the water level is higher than the clothes level, a crossing point in the amplitudes of the signals occurs. During the filling of the tub, the 950 nanometer light has a higher amplitude than the 880 nanometer light. As the tub fills, a crossing of the amplitudes of the voltages occurs because the absorption rates are now different due to the surface of the water which causes the 880 nanometer light to have a higher amplitude than the 950 nanometer light and is the opposite of what occurred during the filling of the tub. The optimum water level occurs at the crossing point and this information is used to control the amount of water needed to correctly fill the washer. This is done by taking the signal and de-energizing the washer's water solenoids (which are energized to fill the tub) and signaling the electromechanical timer in the washing machine to begin the wash cycle.

Figure 7:
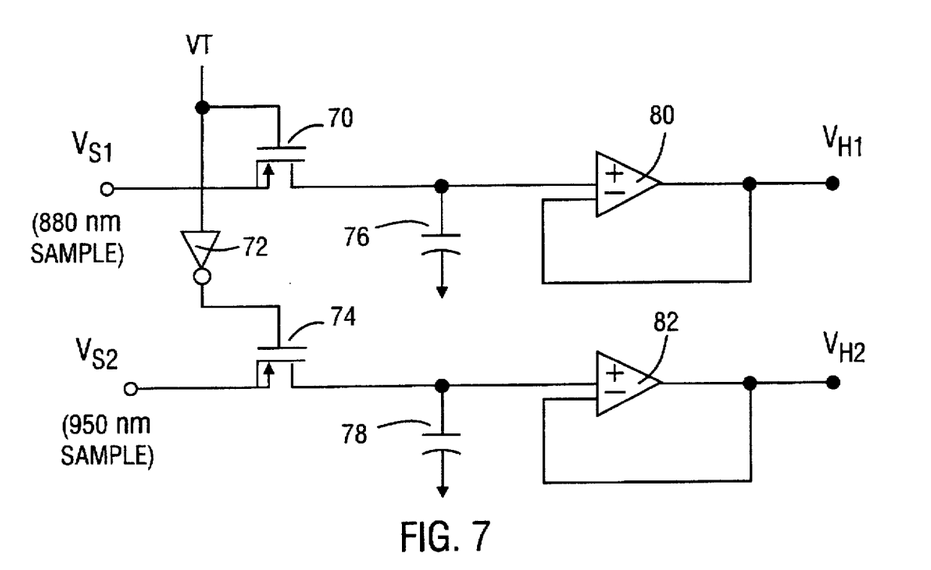
FIG. 7 shows the sample and hold circuit according to principles of the current invention.

A sample and hold circuit illustrated in FIG. 7 is used to sample and hold the sampled voltages for later processing which determines the optimum water level for the tub. Vt, which represents the pulse train signal produced by the timing circuit, turns on MOSFET 70 whenever Vt is high. Vt is also inverted by inverter 72 to turn off MOSFET 74. MOSFET 70 acts as a switch and capacitor 76 is charged when MOSFET 76 is on. The voltage is amplified by operational amplifier 80 and held as output voltage Vh1. Conversely, when Vt is low, MOSFET 74 conducts and capacitor 78 charges. This voltage is amplified by operational amplifier 82 and held as output voltage Vh2. In this situation, MOSFET 70 will not conduct since Vt is low.

Figure 8:
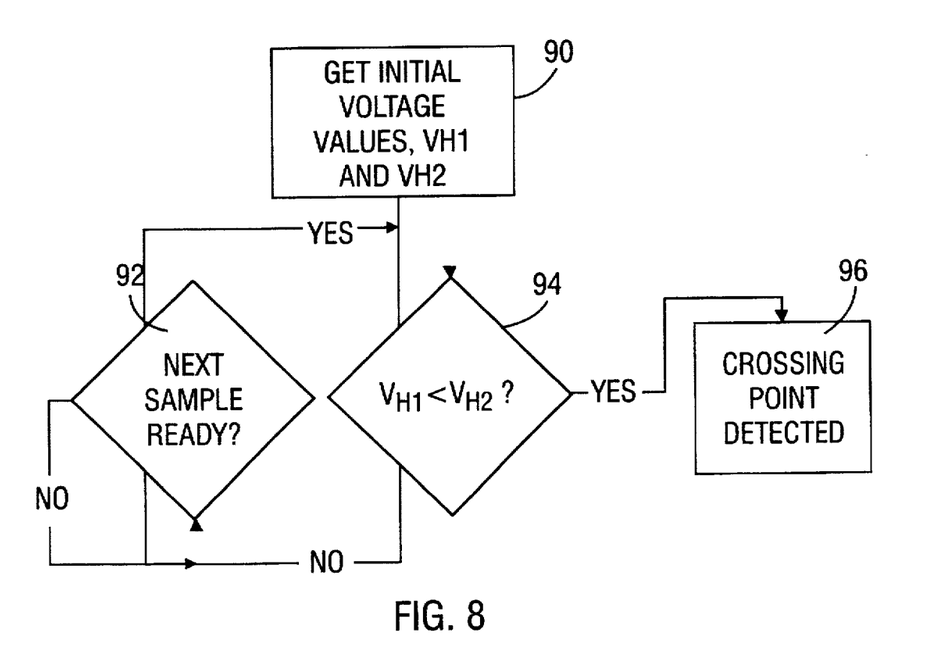
FIG. 8 shows a flowchart of the crossing-point detection algorithm used by the present invention.

The crossing-point detection circuit uses either digital or analog electronics to detect the crossing-point. In the case of digital electronics, a microprocessor stores, in a memory, the values of the voltages from each sensor. As shown in the flowchart of FIG. 8, the microprocessor initially gathers the values of the two voltages Vh1 and Vh2 at step 90. At step 94, the microprocessor compares the two voltages to see if one is still less than the other. If the answer is negative, the microprocessor advances to step 92 and waits at step 92 until the next set of samples is ready. When the answer at step 92 is negative, the microprocessor continues at step 94, as described above. When the answer to step 94 is positive, this means that the values of the voltages have crossed, and a crossing point has been detected. At step 96, the crossing point has been determined and the microprocessor communicates this information to adjust the water level. The filling of the tub is controlled by using the detection of a crossing point to creating a timing pulse, as is known in the art, and by using the timing pulse to de-energize the washer's water solenoids and signal the electromechanical timer in the washing machine to begin the wash cycle.

Figure 9:
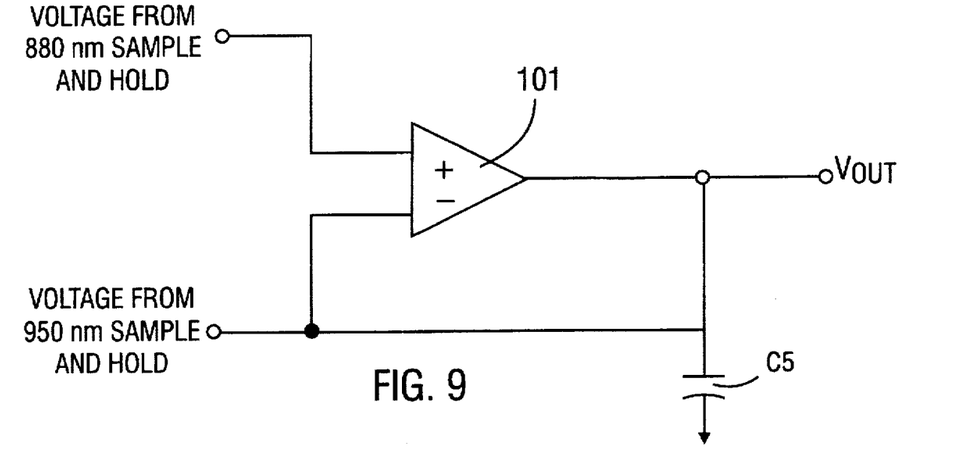
FIG. 9 shows an analog crossing-point detection circuit according to principles of the current invention.

Referring next to FIG. 9, a block diagram shows an analog version of the crossing point detection circuit. This is a simple comparator circuit where the 880 nanometer sample and hold voltage is input into the positive terminal of operational amplifier 101 and where the 950 nanometer sample and hold voltage is input into the negative terminal. The output of the comparator will change when the crossing point has occurred. This information is then used by other circuitry to control the filling of the tub. Referring again to FIG. 2, the filling of the tub is controlled by taking the output of detection circuit 36, creating a timing pulse in control circuit 38, and using the timing pulse to de-energize the washer's water solenoids 39b and signal the electromechanical timer in the washing machine's timing circuitry 39a to begin the wash cycle.

The cross-over point that the invention detects is an "initial" cross-over point. The point is referred to as an "initial" cross-over because, the clothes may not be correctly leveled when the initial cross-over point is determined. Therefore, when the initial crossing point has been determined, the control circuit 38 activates the drum's agitation circuitry 39c so that the drum is agitated for a period of time, typically 10 seconds, to level the clothes off. Then, the receivers 32 recheck to determine if water is being sensed. If the receivers 32 detect water, then the system has detected the actual crossing point and continues as described below. On the other hand, if clothes are detected, then the system continues as described above until a new crossing point has been detected. At that time, no more agitation is required since the true crossing point has been detected. In this case, control circuit 38 sends signals to the washer's timing circuitry 39a to begin the wash cycle and to de-energize solenoid 39b.

When the actual crossing point has been detected, the filling of the tub can be stopped immediately by having the system's control circuit 38 send a signal which de-energizes the washing machine's water solenoids 39b immediately. In an alternate embodiment, a timer in the control circuit 38 sends a signal, which de-energizes the washing machine's water solenoids 39b, after a preset period of time. In yet another embodiment, a timer can be set by the user to send a signal which de-energizes the washing machine's water solenoids 39b, for example, after 3 seconds.

The above discussion is in reference to the initial filling of the tub of the washing machine. After the first filling, the tub is filled to only a portion of the amount of water used for the initial filling since, in subsequent cycles, the clothes are soaked with water and occupy less volume. Within the control circuit 38, a timing circuit records the time period during which the water valve is open for the initial filling. The value is then stored, for example, in a memory storage device. A microprocessor uses the value stored in the memory storage device and computes a portion of the stored value, for example 75 percent. On subsequent fillings, the system de-energizes the washing machine's water solenoids 39b after the new computed time period.

Figure 10:
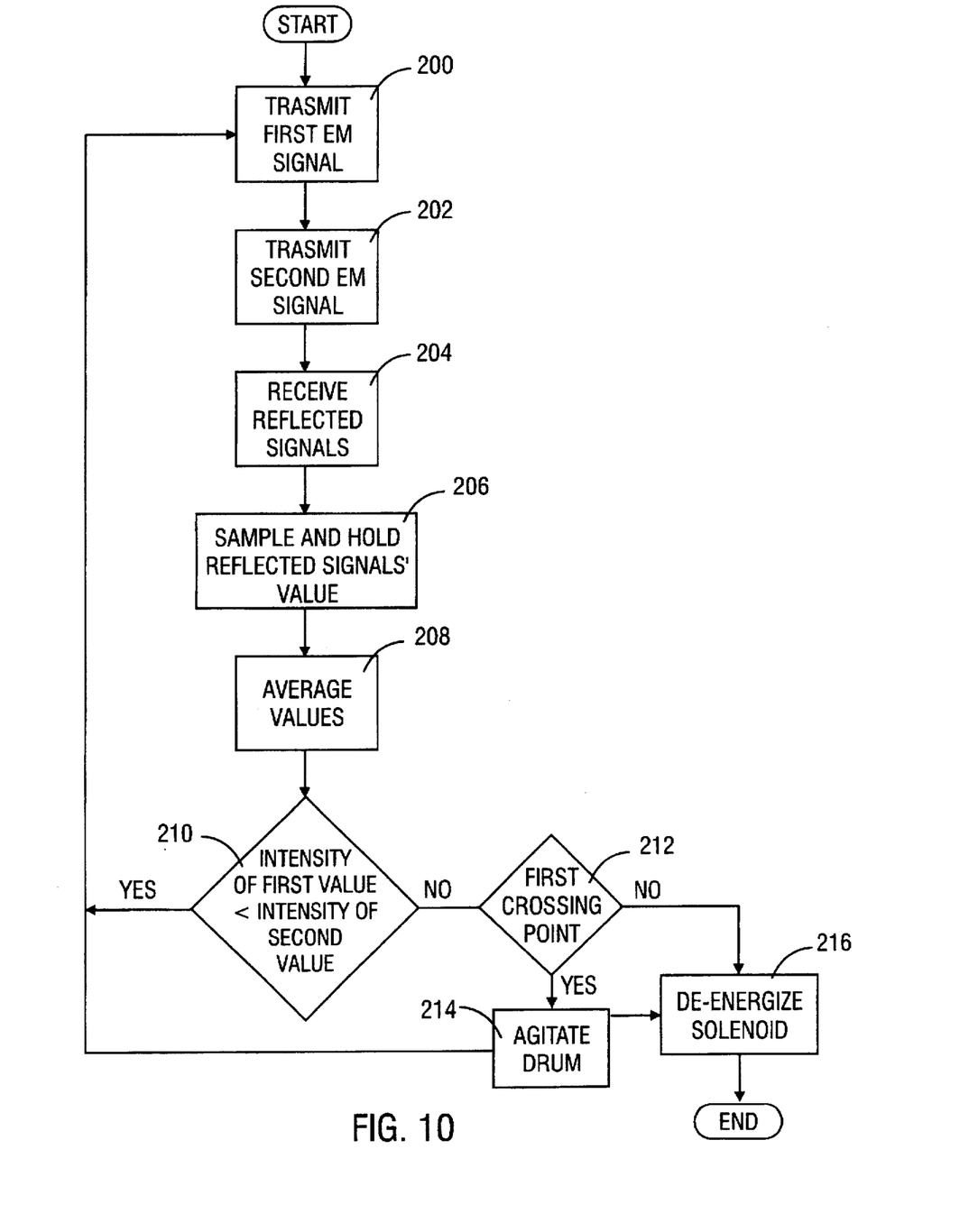
FIG. 10 shows a flowchart illustrating a method for detecting a fluid according to principles of the present invention.

A method for detecting the presence of a fluid in a washing machine tub is described in the flowchart of FIG. 10. A first electromagnetic (EM) signal is transmitted at step 200. A second electromagnetic signal is transmitted at step 202. Then, at step 204 reflected electromagnetic signals are received and their values determined. These values are sampled and held for later use at step 206 and averaged at step 208. Then, the value of the first reflected signal is compared to the value of the second reflected signal at step 210. If the value of the first reflected signal is less than the value of the second reflected value, then the algorithm returns to step 200. If the answer is negative, then at step 212, the algorithm determines whether this is the first crossing point. If the answer is affirmative, then the drum is agitated at step 214 and the algorithm continues at step 200. If the answer at step 212 is negative, then at step 216 the solenoid of the washing machine is de-energized.

Figure 11:
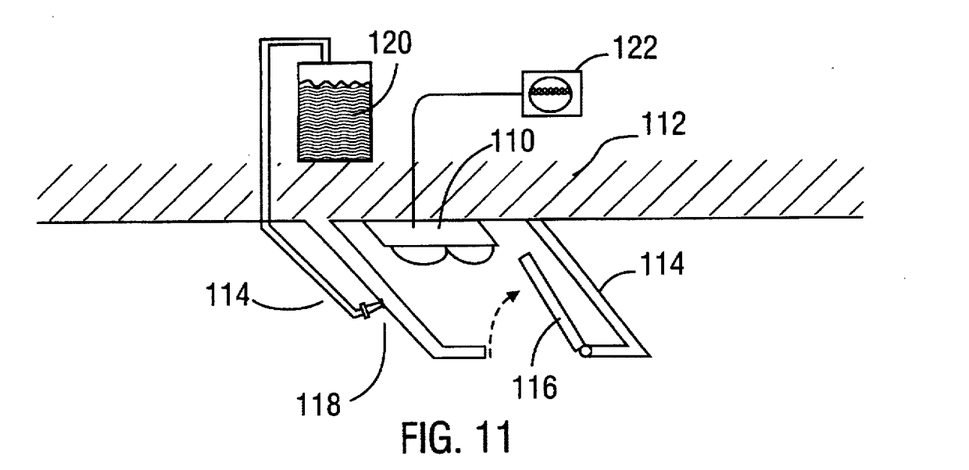
FIG. 11 shows the system as used on the underside of a vehicle.

A fluid detection system of the present invention for use with vehicles is shown in FIG. 11. In an alternate embodiment, the detection system is mounted to the underside of a motorized vehicle to detect dangerous pavement conditions that exist when rain, snow, or ice is present on the pavement. If used with vehicles, the system would have the capability of ignoring false readings, for example, when the vehicle passed over a puddle. To avoid false readings, the system would wait for a certain time (e.g., 30 seconds) to verify that the automobile has not passed over a small amount of fluid before warning the operator of the vehicle. A sensor arrangement 110, as described above is mounted on the bottom section of a vehicle 112. The sensor 110 is mounted in housing 114 which shields the sensor 110 from unnecessary wear when not in use. A door 116 is retracted, as shown, when the sensor is in use. This door 116 is retracted by airflow when the vehicle is moving. Alternatively, the system could use electromechanical means to lift the door whenever the engine of the vehicle is running or at other convenient times during the operation of the vehicle. The system uses a water jet 118 to periodically clean the sensor arrangement 110 with water from reservoir 120. The water jet is activated every time the ignition of the vehicle is turned on. Conversely, the water jet may be activated at any other convenient time. The system uses a warning light 122 mounted on the dashboard of the vehicle to warn the user of the vehicle when the vehicle has passed onto dangerous pavement conditions. Alternatively, the system can send a signal to pre-existing lights in the vehicle to warn the user. The system uses the detection of the crossing point, as described above, to initiate the warning to the user.

Figure 12:
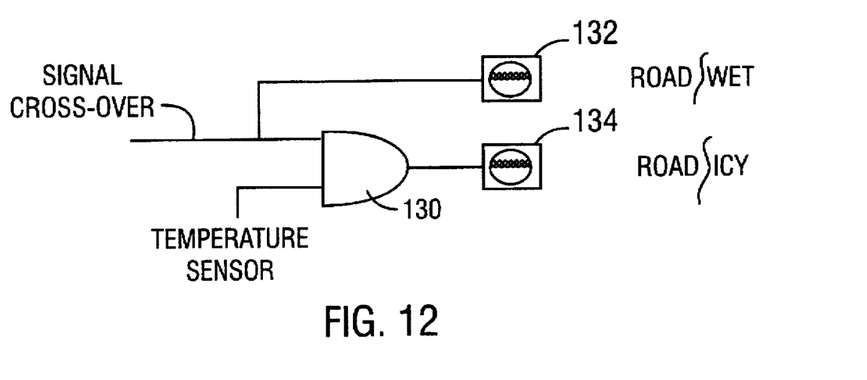
FIG. 12 shows the system used on the underside of a vehicle which detects wet and icy conditions.

In yet another embodiment of the present invention, a non-contacting temperature sensor provides the user the temperature of the road. As shown in FIG. 12, the output of the crossing-point detection circuit is input to an AND gate 130. By itself, the crossing-point signal indicates that the road is wet and this information can be sent to appropriate circuitry, such as a warning light, to relay this information to the driver. A temperature sensor supplies the other input to the AND gate 130 and indicates when the sensor detects that the air temperature is below a certain temperature, for example thirty-two degrees Fahrenheit. Thus, the ANDing of the two signals will produce a signal at the output of the AND gate 130 which indicates that the road is icy. This information can be sent, for example, to warning lights 132 and 134 on the instrument panel to alert the driver to wet or icy road conditions.

Thus, a level detector system capable of detecting the optimum level of a fluid using a minimum amount of electrical circuitry is provided. This system detects the optimum level of a fluid in a container being filled by the fluid and also adjusts the level of the fluid to conform to the optimum fluid level. It can be used to detect the optimum level of water in tubs used in consumer appliances as well as dangerous levels of fluids on surfaces such as pavement and floors. In the later embodiment, it is used to warn users of the surfaces of the dangerous fluid level.

Furthermore, the invention provides a water level setting device that is automatic, and, therefore, easier for a customer to use. The embodiments of the invention described above also provide for a device that detects the optimum water level of a filling tub resulting in water savings which will be significant.

While the present invention has been described with reference to one or more particular embodiments, those skilled in the art will recognize that many changes may be made thereto without departing from the spirit and scope of the present invention, which is set forth in the following claims.

We claim:

1. A system for monitoring and adjusting the water level in a washing machine comprising:

transmission means for alternately emitting a first infrared electromagnetic signal having a first wavelength and a second electromagnetic signal having a second wavelength;

sensor means for receiving first reflected infrared signals from said first emitted infrared electromagnetic signals and converting said first reflected infrared signals into a first plurality of electrical signals and for receiving second reflected infrared signals from said second emitted infrared electromagnetic signals and converting said second reflected infrared signals into a second plurality of electrical signals;

sample and hold means for sampling said first and second plurality of electrical signals and storing the magnitudes of said first and second plurality of electrical signals;

comparison means for determining the optimum level of water in said washing machine by comparing the magnitudes of said first and second plurality of electrical signals and detecting when the magnitude of either said first or second plurality of electrical signals becomes greater than the magnitude of the other just past a crossing-point;

control means responsive to the passing of said crossing-point for adjusting the water flow into said washing machine.

2. The apparatus of claim 1 where passing said crossing-point is determined by a comparator.

3. The apparatus of claim 1 where passing said crossing point is determined by using a microprocessor.

4. A method for monitoring fluid levels comprising the steps of:

transmitting infrared electromagnetic signals toward a fluid using a first and second transmitter, each transmitter emitting infrared signals at a different wavelength;

sensing electromagnetic signals reflected from said fluid;

creating a plurality of electrical signals indicating the intensity of said reflected signals; and determining the level of said fluid by comparing the intensities of said plurality of electrical signals.

5. The method of claim 4 wherein step of transmitting uses transmitters which are light emitting diodes.

6. The method of claim 4 wherein said step of sensing uses a pair of sensors capable of sensing reflected electromagnetic signals.

7. The method of claim 4 further comprising a step of removing foreign material from said sensors and transmitters.

8. A method for monitoring and adjusting the water level in the tub of a washing machine, said method comprising:

creating timing pulses;

transmitting first infrared signals having a first wavelength and second infrared signals having a second wavelength toward said water in said tub upon the detection of said timing pulses;

receiving a plurality of reflected infrared signals from said first and second transmitted infrared signals;

creating first electrical signals indicating the intensity of said reflected infrared signals from said first transmitted infrared signals;

creating second electrical signals indicating the intensity of said reflected infrared signals from said second transmitted infrared signals;

comparing the intensities of said first and second electrical signals and determining when the intensity of either said first or second electrical signals becomes greater than the intensity of the other just past a crossing-point; and adjusting the flow of water into said tub when said crossing-point has been passed.

* * * * *